United States Patent

Yoshizawa et al.

[11] Patent Number: 5,892,997
[45] Date of Patent: Apr. 6, 1999

[54] FILM REWINDING APPARATUS FOR A CAMERA

[75] Inventors: Akihiro Yoshizawa, Yokohama; Toshiyuki Nakamura, Tokyo; Youichi Yamazaki, Kawasaki, all of Japan

[73] Assignee: Nikon Corporation, Tokyo, Japan

[21] Appl. No.: 912,090

[22] Filed: Aug. 15, 1997

Related U.S. Application Data

[63] Continuation of Ser. No. 748,396, Nov. 13, 1996, abandoned.

[30] Foreign Application Priority Data

Nov. 16, 1995 [JP] Japan .................................. 7-298150

[51] Int. Cl.$^6$ .................................................. G03B 13/02
[52] U.S. Cl. ........................................... 396/410; 396/413
[58] Field of Search .................................... 396/406, 409, 396/410, 413

Primary Examiner—Eddie C. Lee
Assistant Examiner—Nicholas T. Tuccillo
Attorney, Agent, or Firm—Oliff & Berridge, PLC

[57] ABSTRACT

A film rewinding apparatus for a camera is described whereby the completion of film rewinding is accurately timed even if environmental conditions change. First edge detecting mechanism is positioned on a winding-spool side of the camera on a path on which perforations of the film pass and second edge detecting mechanism is positioned on the film cartridge side of the camera. A set time period used by a timer for timing the completion of the film rewinding is calculated based on a time period during which perforation edges detected by the first edge detecting mechanism are detected by the second edge detecting mechanism. If the perforation edges of the film are not detected within the set time period, a determination is made that the film rewinding has been completed and the rewinding operation is terminated.

14 Claims, 11 Drawing Sheets

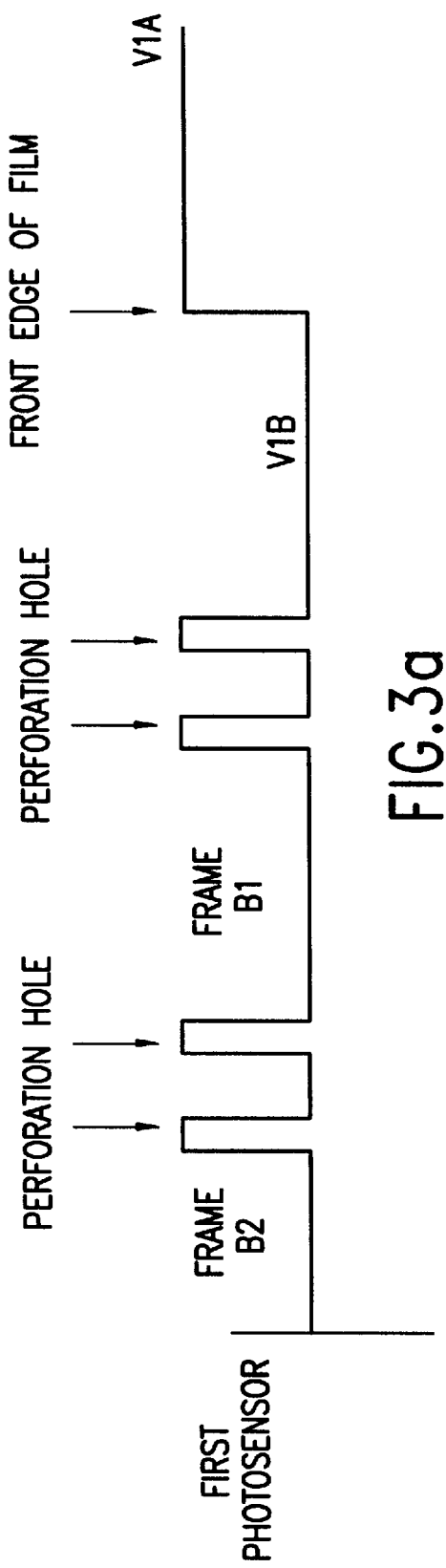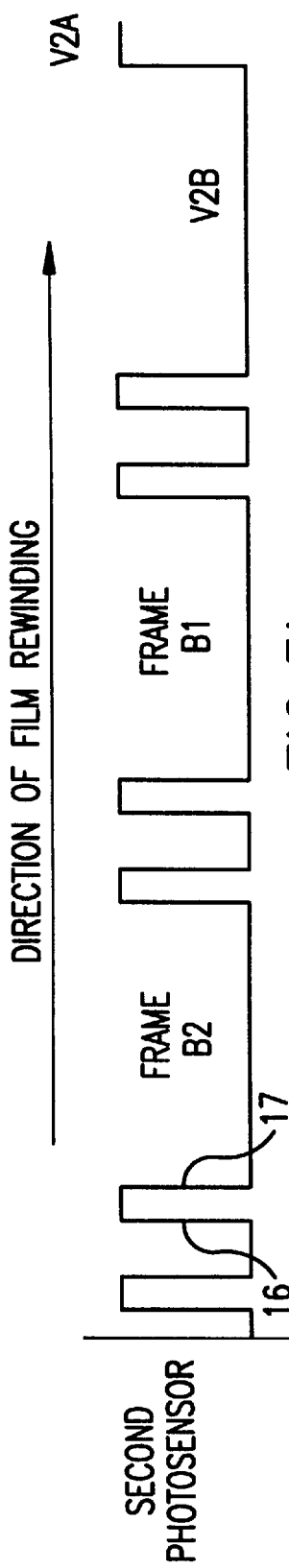

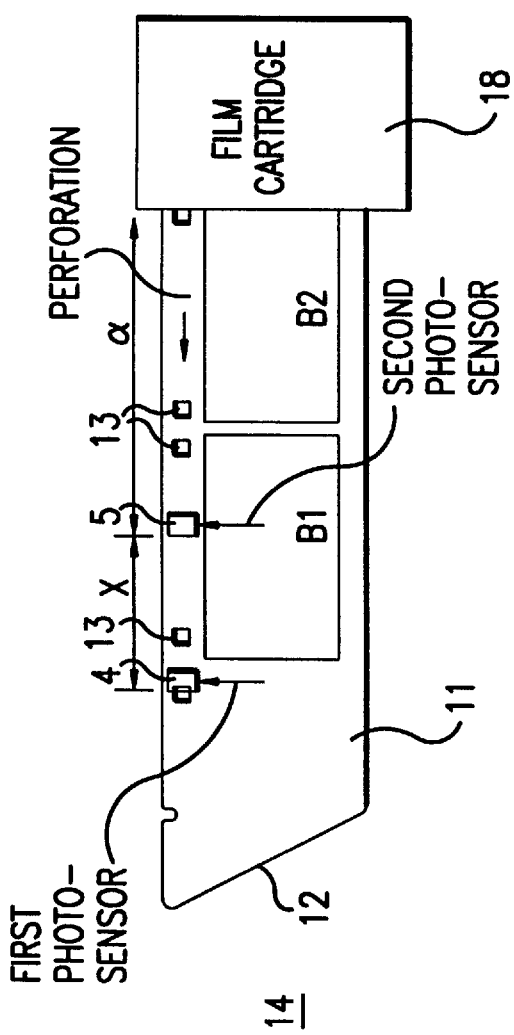
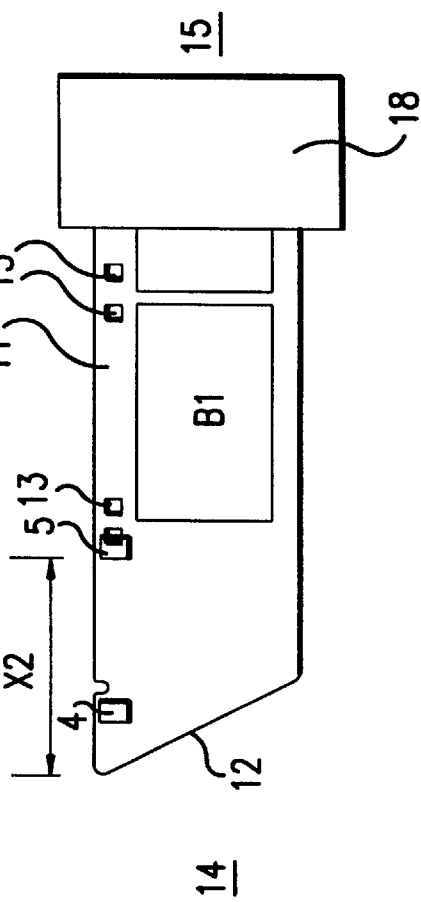
FIG.7a
FIG.7b

FILM REWINDING APPARATUS FOR A CAMERA

This is a continuation of application Ser. No. 08/748,396 filed Nov. 13, 1996 now abandoned.

BACKGROUND OF THE INVENTION

1. Field of the Invention

The present invention relates to an apparatus for a camera which rewinds film into a cartridge. Particularly, the present invention relates to a film rewinding apparatus in which the method for setting a timer that times the rewinding is improved.

2. Description of Related Art

Film rewinding apparatuses for cameras that rewind film into a cartridge are generally known.

In these film rewinding apparatuses, a timer is provided to time when the rewinding is to be completed. That is, a fixed time period or a time period corresponding to the power source voltage at the time of starting the film rewinding is set into a rewinding completion timer and a determination is made that the rewinding has been completed if film perforation detecting signals are not output from photosensors.

However, in conventional film rewinding apparatuses of cameras, changes in the surrounding temperature cause frictional forces in the driving systems or the battery power voltage fluctuates so that the number of driving rotations of the rewinding motor changes. This creates a problem in that various types of experiments must be conducted under differing environmental conditions to determine the set time period for use by the timer in order that the timer could accurately time the completion of the rewinding operation.

It is an object of the present invention to provide a film rewinding apparatus which accurately times the completion of rewinding the film without regard to changes that occur in environmental conditions.

SUMMARY OF THE INVENTION

In order to achieve the above objective, a film rewinding apparatus of the present invention adapted for use with a camera comprises rewinding means for rewinding film into a film cartridge and controlling means which determine completion of film rewinding and terminate the rewinding operation performed by the rewinding means when perforations formed along at least one edge of the film are no longer detected within a set time period. The film rewinding apparatus of the present invention also includes first edge detecting means for detecting the perforation edges of perforations formed into the film which are positioned on a winding-spool side of the camera on a path on which the perforations of the film pass, second edge detecting means for detecting the perforation edges which are positioned on a film cartridge side of the camera on the path on which the perforation edges of the film pass, timing means for timing the time period during which the perforation edges detected by the first edge detecting means are detected by the second edge detecting means, calculating means for calculating the set time period used by the timer for timing the completion of the film rewinding based on the time period determined by the timing means, and setting means for setting a set time period that is calculated by the calculating means into the timer so that the timer can time the completion of film rewinding.

The first edge detecting means are positioned on the winding-spool side on the path on which the perforations of the film pass and the second edge detecting means are positioned on the film cartridge side. The set time used by the timer for timing the completion of the film rewinding is calculated based on the time period during which the perforation edges detected by the first edge detecting means are detected by the second edge detecting means. If the perforation edges of the film are not detected within the set time period, a determination is made that the film rewinding has been completed and the rewinding operation is terminated.

In the film rewinding apparatus of the present invention for a camera, the calculating means calculate the set time period based on the time period determined by the timing means and a distance measured between the first edge detecting means and the second edge detecting means and between the second edge detecting means and the film cartridge.

In a second embodiment, the film rewinding apparatus of the present invention for a camera includes rewinding means for rewinding film into the film cartridge and controlling means which determine the completion of film rewinding and terminate the rewinding operation accomplished by the rewinding means when the perforation edges of the film are no longer detected within the set time period used by the timer for timing the completion of the film rewinding. The film rewinding apparatus of the present invention for a camera also includes first edge detecting means for detecting the perforation edges which are positioned on the winding-spool side on the path on which the perforations of the film pass, second edge detecting means for detecting the perforation edges which are positioned on the film cartridge side on the path on which the perforations of the film pass, timing means for timing the time period during which the last perforation edge of a plurality of perforation edges extending along each frame detected by the first edge detecting means are detected by the second edge detecting means, calculating means for calculating the set time period used by the timer for timing the completion of the film rewinding based on the time period determined by the timing means, and setting means for setting the set time period calculated by the calculating means into the timer so that the timer can time the completion of film rewinding.

The first edge detecting means are positioned on the winding-spool side on the path on which the perforations of the film pass and the second edge detecting means are positioned on the film cartridge side. The set time period used by the timer for timing the completion of film rewinding is calculated based on the time period during which the last perforation edges of a plurality of perforation edges extending along each frame detected by the first edge detecting means are detected by the second edge detecting means. If the perforation edges of the film are not detected within the set time period, a determination is made that the film rewinding has been completed and the rewinding operation is terminated.

In the film rewinding apparatus of the present invention for a camera, the calculating means calculates the set time period based on the time period determined by the timing means and a distance measured between the first edge detecting means and the second edge detecting means and between the second edge detecting means and the film cartridge.

In a third embodiment, the film rewinding apparatus of the present invention for a camera includes rewinding means for rewinding film into the film cartridge and controlling means which determine the completion of film rewinding and terminate the rewinding operation performed by the rewinding means when the perforation edges of the film are no longer detected within the set time period used by the timer for timing the completion of film rewinding. The film rewinding apparatus of the present invention for a camera also includes first front edge detecting means for detecting a front edge of the film and the perforation edges which are positioned on the winding-spool side on the path on which the perforations of the film pass, second front edge detecting means for detecting the front edge of the film and the perforation edges which are positioned on the film cartridge side on the path on which the perforations of the film pass, timing means for timing the time period during which the front edge of the film detected by the first front edge detecting means are detected by the second front edge detecting means, calculating means for calculating the set time period used by the timer for timing the completion of the film rewinding based on the time period determined by the timing means and setting means for setting the set time period calculated by the calculating means into the timer for timing the completion of film rewinding.

The first front edge detecting means are positioned on the winding-spool side on the path on which the perforations of the film pass and the second front edge detecting means are positioned on the film cartridge side. The set time period used by the timer for timing the completion of the film rewinding is calculated based on the time period during which the perforation edges detected by the first front edge detecting means are detected by the second front edge detecting means. If the perforation edges of the film are no longer detected within the set time period, a determination is made that the film rewinding has been completed and the rewinding operation is terminated.

In the third embodiment of the film rewinding apparatus of the present invention for a camera, the calculating means calculates the set time period based on the time period determined by the timing means and a distance measured between the first front edge detecting means and the second front edge detecting means and between the second front edge detecting means and the film cartridge.

BRIEF DESCRIPTION OF THE DRAWINGS

FIGS. 3a and 3b illustrate graphs representing output waveforms of the first and the second photosensors;

FIGS. 7a and 7b are diagrammatic views illustrating the camera film as it advances into a film cartridge for understanding a method of calculating the set time period used by the timer for timing the completion of rewinding in the second embodiment of the film rewinding apparatus of the present invention;

DETAILED DESCRIPTION OF THE PREFERRED EMBODIMENTS

Prior to the explanation of the embodiments of the film rewinding apparatus of the present invention, the general operation of film winding and rewinding in a camera is described.

In the camera, when a film cartridge is loaded into a cartridge chamber and after it has been confirmed that the cartridge chamber cover has been closed and that the film cartridge is present in the cartridge chamber, the first frame of the film is fed into a specified shooting position by a film feeding motor. Photosensors, such as photoreflectors or photointerrupters, are positioned on a film feeding path to detect perforations in the film to control an amount of the film feeding and to control termination of the film feeding at a predetermined position. Normally, the photosensors are arranged so that a frame of the film to be shot can be set at a specified shooting position when the film feeding is terminated as the perforations are detected.

Moreover, in the camera, the film is advanced by one frame every time a picture is taken, i.e., shot, and preparation for the next shooting operation is performed. Here, the advancement of the film by one frame is controlled based on the number of the perforations detected. If the number of perforations corresponding to one frame has not been detected, a determination is made that the film has been wound to its end and the winding operation is stopped. Thereafter, the film is rewound into the cartridge by the film feeding motor.

Figure 1:
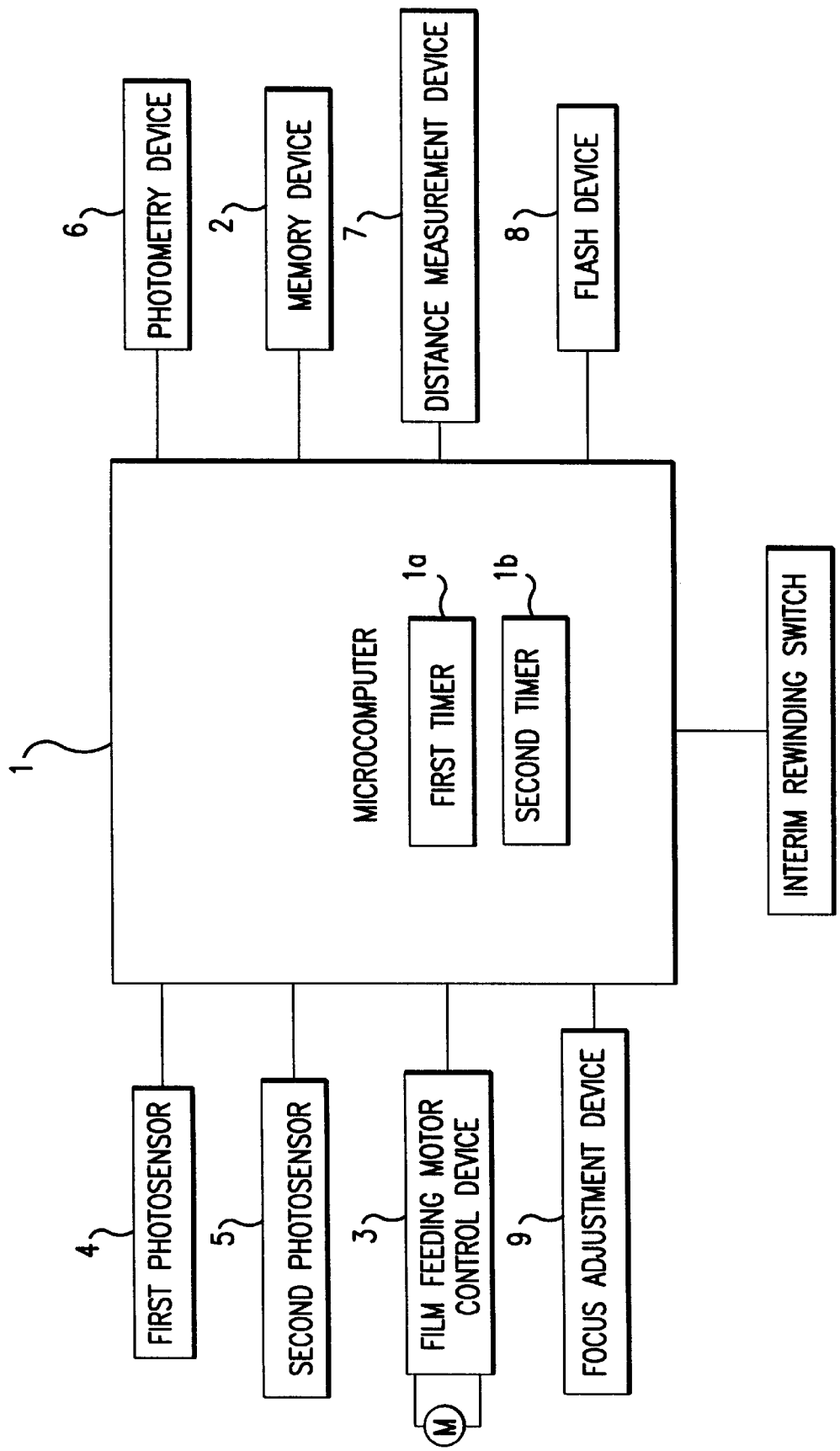
FIG. 1 is a block diagram representing a camera incorporating a film rewinding apparatus of the present invention.

FIG. 1 represents a camera incorporating a first embodiment of a film rewinding apparatus of the present invention. This camera, as will be explained later, is common throughout three embodiments of the present invention described herein.

In FIG. 1, a microcomputer 1 is connected to a memory device 2, a film feeding motor control device 3, a first photosensor 4, a second photosensor 5, a photometry device 6, a distance measurement device 7, a flash device 8, a focus adjustment device 9 and an interim rewinding switch 10. The microcomputer 1 includes an A/D conversion function, a calculation function, a comparison function and the like, to control various kinds of calculations for the photometry device 6, the distance measurement device 7, the flash device 8, and the focus adjustment device 9. In addition, the microcomputer 1 has a first timer 1a for timing the completion of the film rewinding, and a second timer 1b which times (counts) the time period taken for the front edge of the film and the perforation edges to pass between the first photosensor 4 and the second photosensor 5. The memory device 2 stores data, such as a threshold value for detecting the perforation edges. The first photosensor 4 and the second photosensor 5 are connected, respectively, to the A/D conversion port of the microcomputer 1.

Figure 2A:
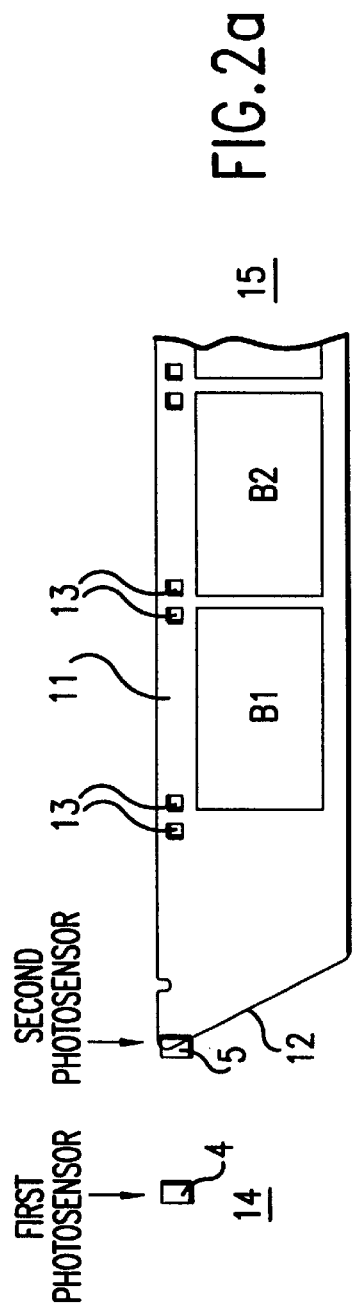
FIGS. 2a–2c are diagrammatic views illustrating positional relationships between camera film and a first and a second photosensor as the camera film advances past the first and second photosensors.
Figure 2B:
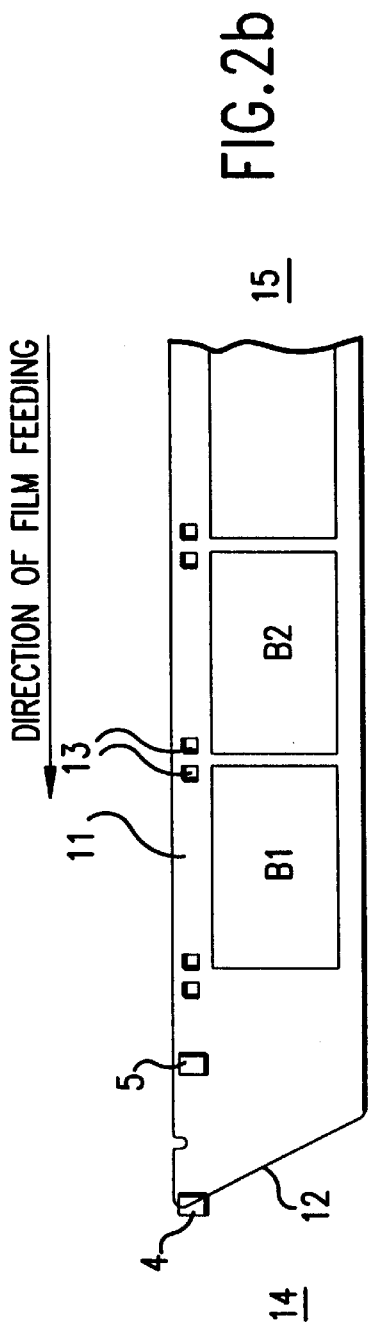
Figure 2C:
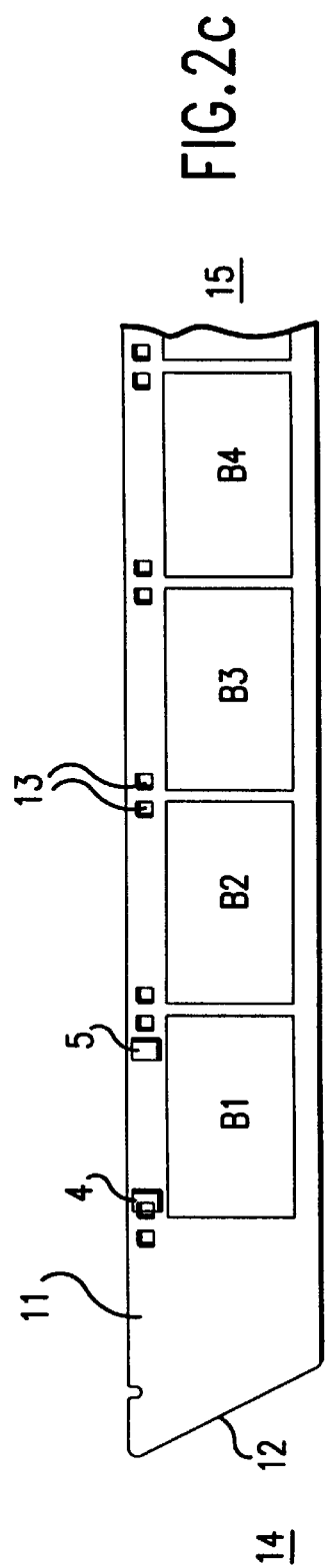

FIGS. 2a–2c show the relationship of positions between film 11, and the first photosensor 4 and the second photosensor 5. In the figures, alphanumeric characters, such as B1 and B2, indicate a particular film frame, denoted by a rectangle containing a specific one of the alphanumeric characters, that will be shot.

When the film 11 travels (i.e., is wound) from right to left as depicted in the FIGS. 2a–2c, for a front edge 12 (film lead) of the film 11 or for perforations 13 in the front edge 12 of the film, a detection signal is first output from the second photosensor 5, and then a detection signal is output from the first photosensor 4. Conversely, when the film 11 travels (i.e., is rewound) from left to right in a reverse direction as shown in FIGS. 2a–2c, for the front edge 12 of the film 11, or for the perforations 13 in the front edge 12 of the film 11, first, the detection signal is output from the first photosensor 4 and then the detection signal is output from the second photosensor 5. That is, the first photosensor 4 is positioned on a winding-spool side 14 of the camera on a path on which the perforations pass, and the second photosensor 5 is positioned on a film cartridge side 15 of the camera on the path on which the perforations pass.

FIGS. 3a and 3b illustrate graphs representing output waveforms of the first and the second photosensors 4 and 5.

In FIGS. 3a and 3b, alphanumeric characters V1A and V2A indicate one of two high level states. In a first high level state, high levels of output signals occur because there is no film in the camera. In a second high level state, perforations are present at the positions of the first photosensor 4 and the second photosensor 5, respectively. Alphanumeric characters V1B and V2B indicate low levels of output signals where there is film in the camera and where perforations are not present at the positions of the first photosensor 4 and the second photosensor 5, respectively. In each photosensor 4 and 5, the output changes between V1A and V1B, and between V2A and V2B, respectively, depending upon the positioning of the film (including the positioning of the perforations) relative to the photosensors 4 and 5. Comparing the levels of the output signals from each photosensor 4 and 5 with threshold values stored in the memory device 2, the output corresponds to a leading or rising edge 16 when the output of the photosensors 4 and 5 exceed the threshold value and a trailing edge 17 when the output decreases to the threshold value. The threshold value is set in the winding operation during film loading, using technologies indicated in JP Laid-Open Patent Application No. 2-77056 or JP Laid-Open Patent Application No. 7-54301.

Figure 4:
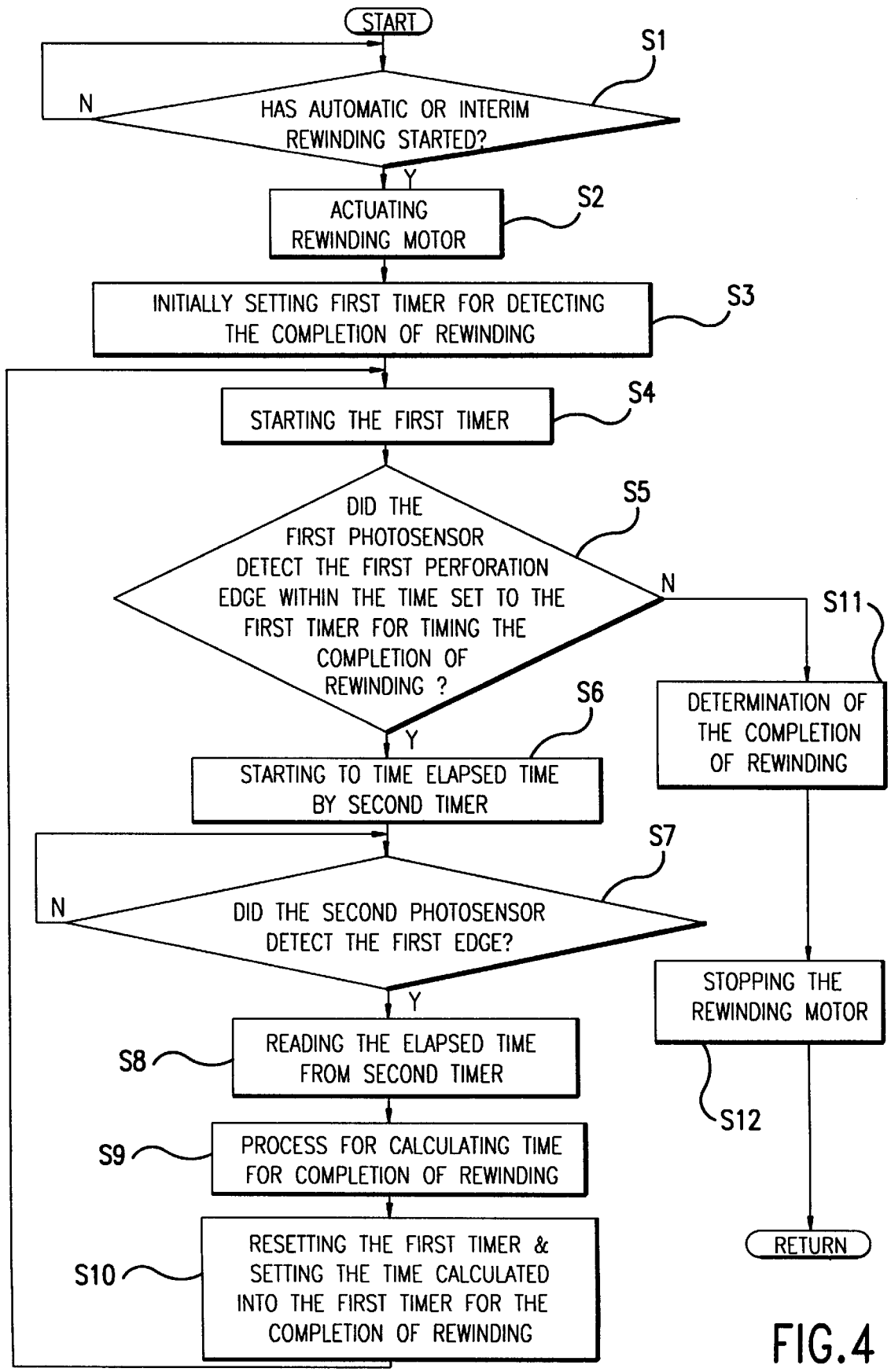
FIG. 4 is a flow chart depicting how a first embodiment of the film rewinding apparatus of the present invention operates.

FIG. 4 is a flow chart depicting how a first embodiment of the film rewinding apparatus of the present invention operates.

Rewinding the film can be commenced either automatically or manually. In automatic rewinding, there are methods in which rewinding is commenced when the film is determined to have been wound to its end such as when no perforations are detected by the photosensors within a set time used by a film end timer, when advancing one frame after the completion of shooting a picture. There is also a method in which rewinding is commenced when shooting has been accomplished for the number of shooting frames in the film read from a DX code or a bar code disk. On the other hand, for manual rewinding, film rewinding is commenced anytime when a picture is not being shot by manually actuating a rewinding switch which is sometimes referred to as "interim rewinding." With reference to FIG. 4, in film rewinding is commenced automatically or manually (S1), a rewinding motor is actuated (S2). At this time, the first timer 1a for timing the completion of the film rewinding is initially set (S3), and then the first timer 1a is started (S4). If no perforation edges are detected within the set time period by the first photosensor 4, a determination is made that the film rewinding has been completed (S5→S11), and the rewinding motor is stopped (S12).

Figure 5A:
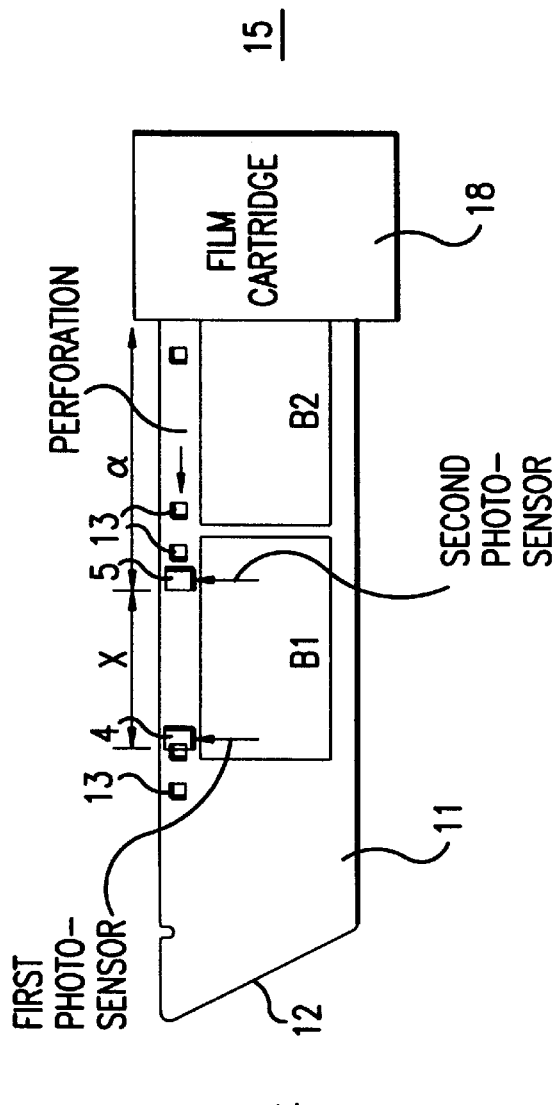
FIG. 5a and 5b are diagrammatic views illustrating the camera film as it advances into a film cartridge for understanding a method of calculating the set time period used by a timer for detecting the completion of rewinding in the first embodiment of the film rewinding apparatus of the present invention.

On the other hand, if the first perforation edge is detected by the first photosensor 4 within the set time period of the first timer 1a for timing the completion of film rewinding (S5), timing of an elapsed time period is commenced by the second timer 1b (S6). In addition, when the film is rewound and if the first perforation edge that was detected by the first photosensor 4 is detected by the second photosensor 5 (S7), the elapsed time period is read from the second timer 1b (S8). Then, the set time period of the first timer 1a for timing the completion of the film rewinding is calculated (S9). Here, assuming the elapsed time period determined by the second timer 1b as "T1", and positional spacing between the first photosensor 4 and the second photosensor 5 as "x" as shown in FIG. 5a, a film rewind speed "v" is calculated as follows:

$$v = x/T1. \qquad \text{[Equation 1]}$$

Figure 5B:
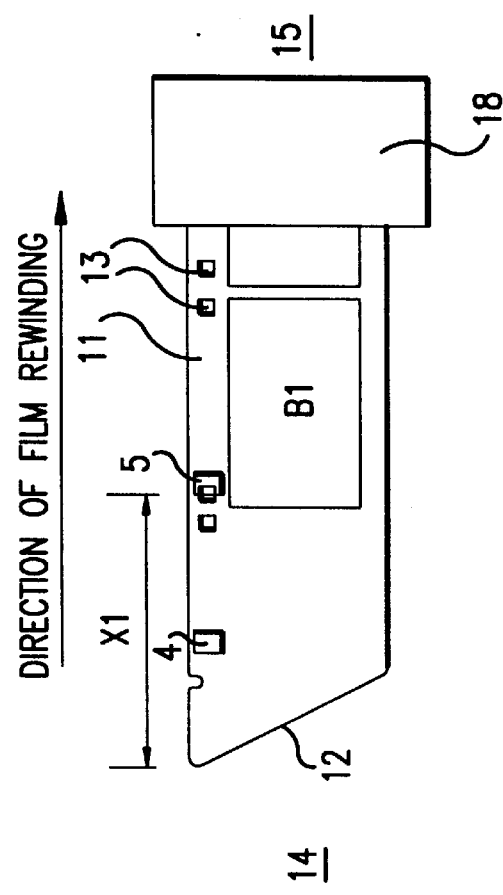

Furthermore, as shown in FIG. 5b, assuming a length from the perforation edge used for timing at the position of the second photosensor 5 to the front edge of the film as "X1", and a distance from the second photosensor 5 to a film cartridge 18 as "α", a time "T2", during which the remaining film is completely rewound, can be determined as follows:

$$\begin{aligned} T2 &= (X1 + \alpha)/v. \qquad \text{[Equation 2]} \\ &= ((X1 + \alpha) \times T1)/x. \end{aligned}$$

The first timer 1a for timing the completion of rewinding is reset, and the second photosensor 5 reestablishes the computed time "T2" to the first timer 1a, when a predetermined number of the perforation edges is determined (S10). Then, the process for rewinding is held until the perforation edge for the next frame is detected by the second photosensor 5 (S5). This is repeated until the perforation edges are not detected by the second photosensor 5 within the set time of the first timer 1a.

If the perforation edges are not detected by the second photosensor 5 within the set time period of the first timer 1a, completion of rewinding is determined (S11), and the rewinding motor is stopped (S12).

Figure 6A:
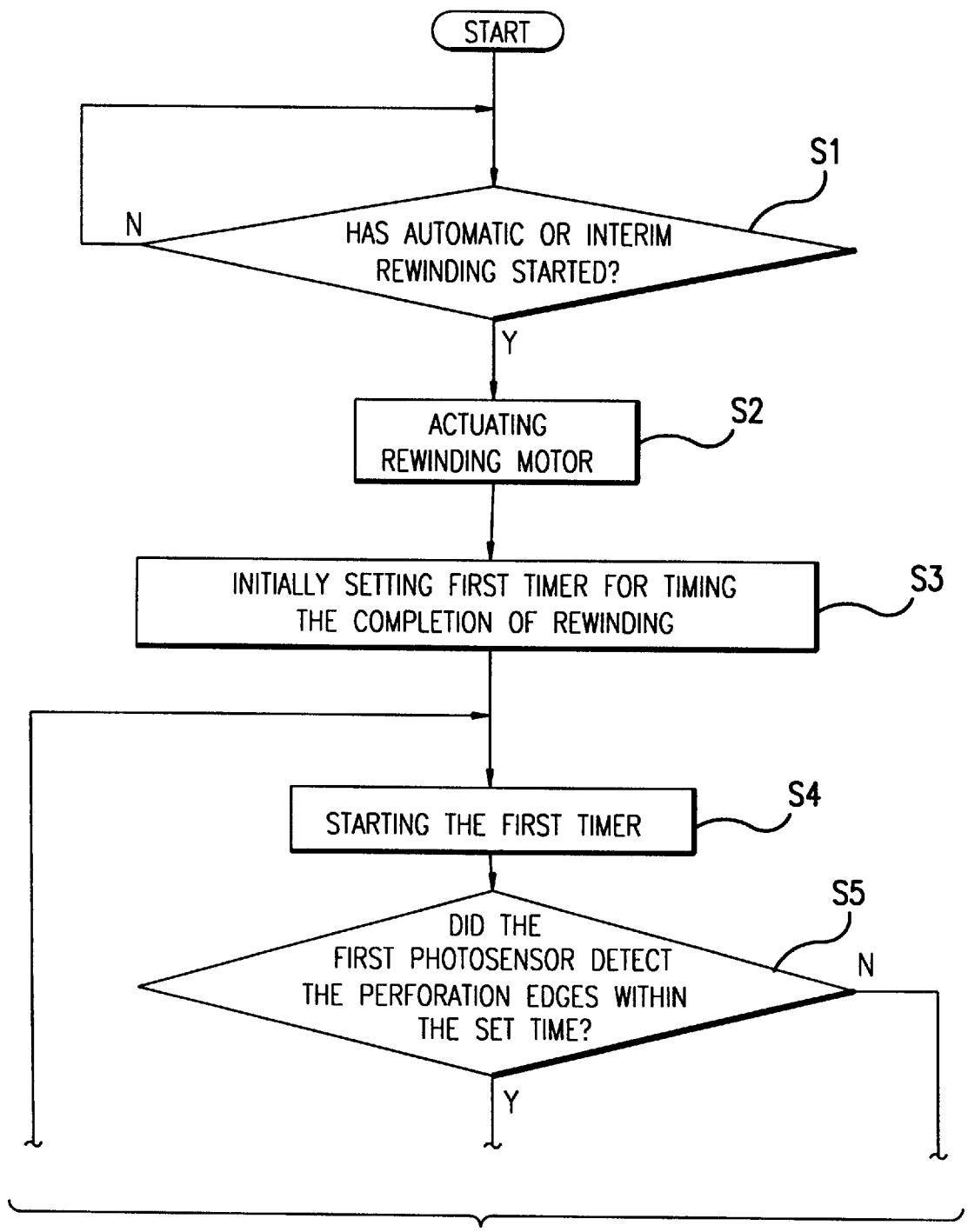
FIG. 6 is a flow chart depicting how a second embodiment of the film rewinding apparatus of the present invention operates.
Figure 6B:
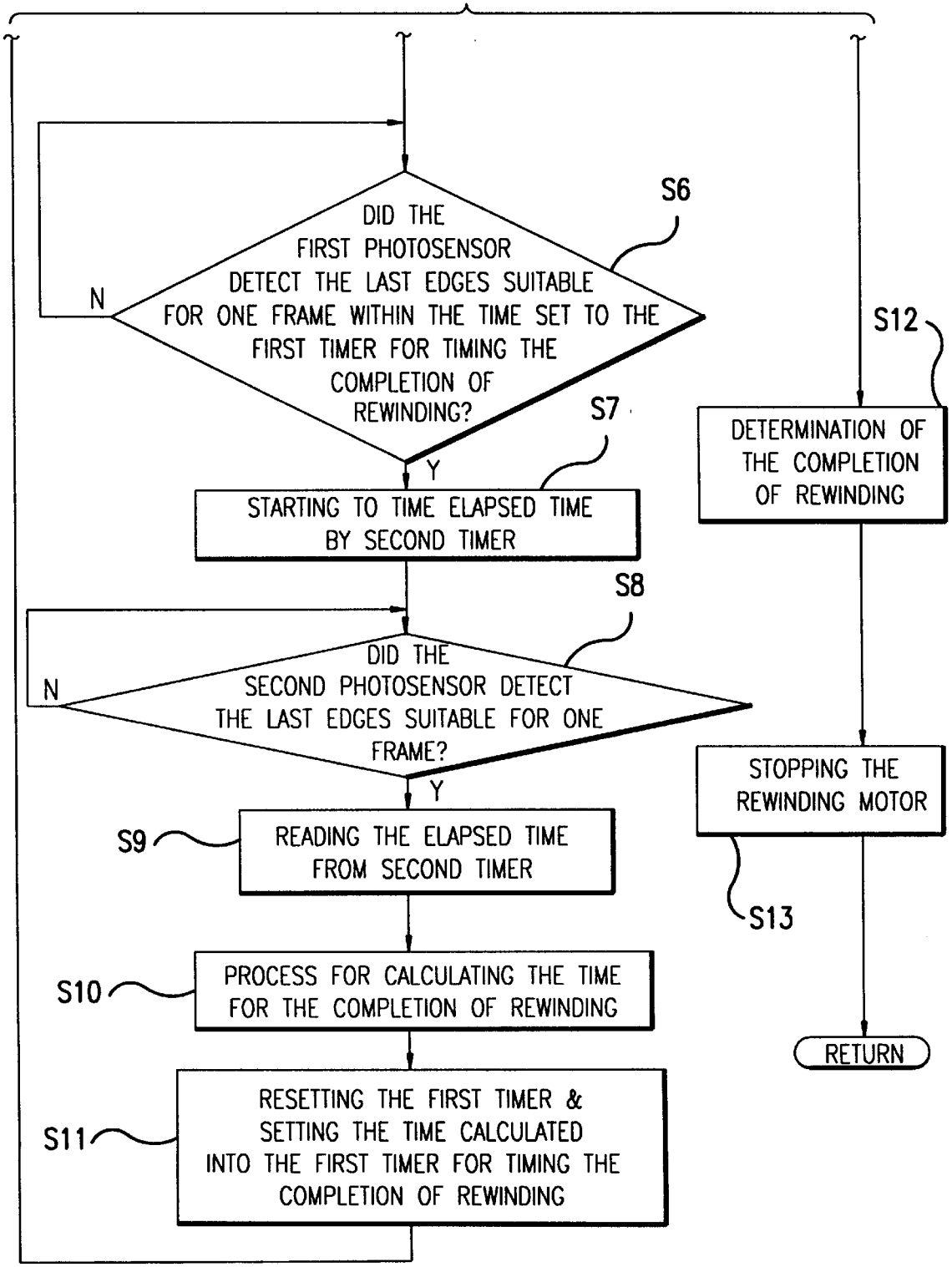

FIG. 6 is a flow chart showing how a second embodiment of the apparatus of the present invention operates film rewinding.

As described earlier, when the film rewinding is commenced automatically or manually (S1), the rewinding motor is activated (S2). At this time, the first timer 1a for timing the completion of the film rewinding is initially set (S3), and then the first timer 1a is started (S4). If no perforation edge is detected within the set time period by the first photosensor 4, a determination is made that the film rewinding has been completed (S5→S11), and the rewinding motor is stopped (S13).

On the other hand, if a perforation edge is detected within the set time period of the first timer 1a (S5), and if the last edge of a plurality of the perforation edges which extend along one frame (e.g., four perforation edges) is detected by the first photosensor 4 within the set time period of the first timer 1a (S6), timing the elapsed time period is commenced by the second timer 1b (S7). If the film is further rewound, and if the last edge of the perforation edges extending along one frame, which was previously detected by the first photosensor 4, is detected by the second photosensor 5 (S8), the elapsed time period is read from the second timer 1b (S9), and the set time period of the first timer 1a for timing the completion of rewinding is calculated (S10).

Assuming the elapsed time period timed by the second timer 1b as "T1" and the positional spacing between the first photosensor 4 and the second photosensor 5 as shown in FIG. 7a as "x", the film rewinding speed "v" is calculated as follows:

$$v = x/T1. \qquad \text{[Equation 3]}$$

Furthermore, as shown in FIG. 7b, assuming a front edge length from the perforation edge used for timing at the position of the second photosensor 5 to the front edge of the film as "X2", and a cartridge length from the second photosensor 5 to the film cartridge 18 as "α" as shown in FIG. 7a, a time "T2" during which the film is completely rewound can be determined as follows:

$$\begin{aligned} T2 &= (X2 + \alpha)/v. \qquad \text{[Equation 4]} \\ &= ((X2 + \alpha) \times T1)/x. \end{aligned}$$

The first timer 1a for timing the completion of rewinding is reset, and the second photosensor 5 reestablishes the computed time "T2" to the first timer 1a when a predetermined number of the perforation edges is determined (S11). Then, the process for rewinding waits until a perforation edge for the next frame is detected by the second photosensor 5 (S5). This is repeated until the perforation edges are not detected by the second photosensor 5 within the set time period of the first timer 1a. If the perforation edges are not detected by the second photosensor 5 within the set time period of the first timer 1a, the completion of rewinding is determined (S12), and the rewinding motor is stopped (S13).

Figure 8A:
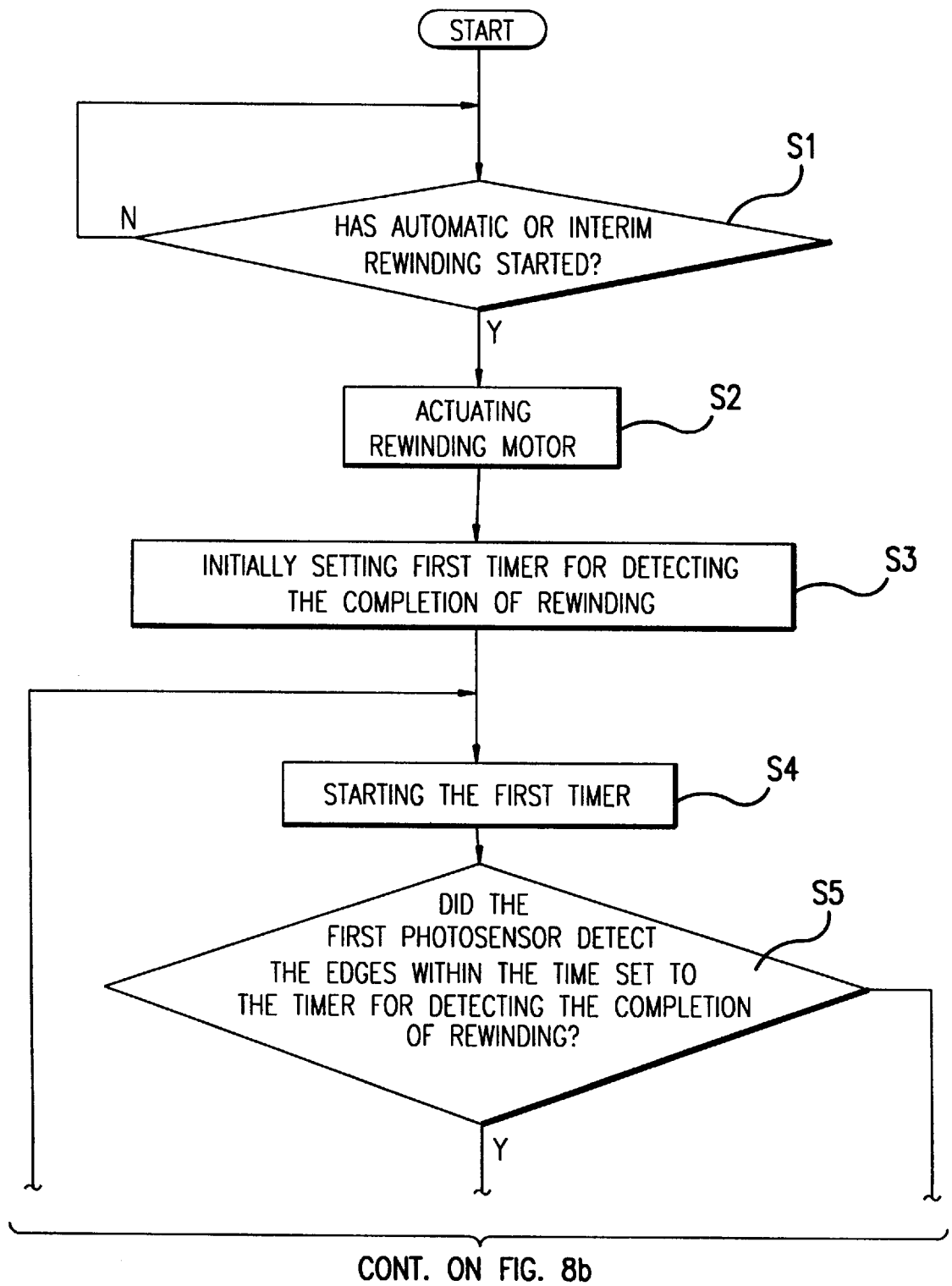
FIG. 8 is a flow chart depicting how a third embodiment of the film rewinding apparatus of the present invention operates.
Figure 8B:
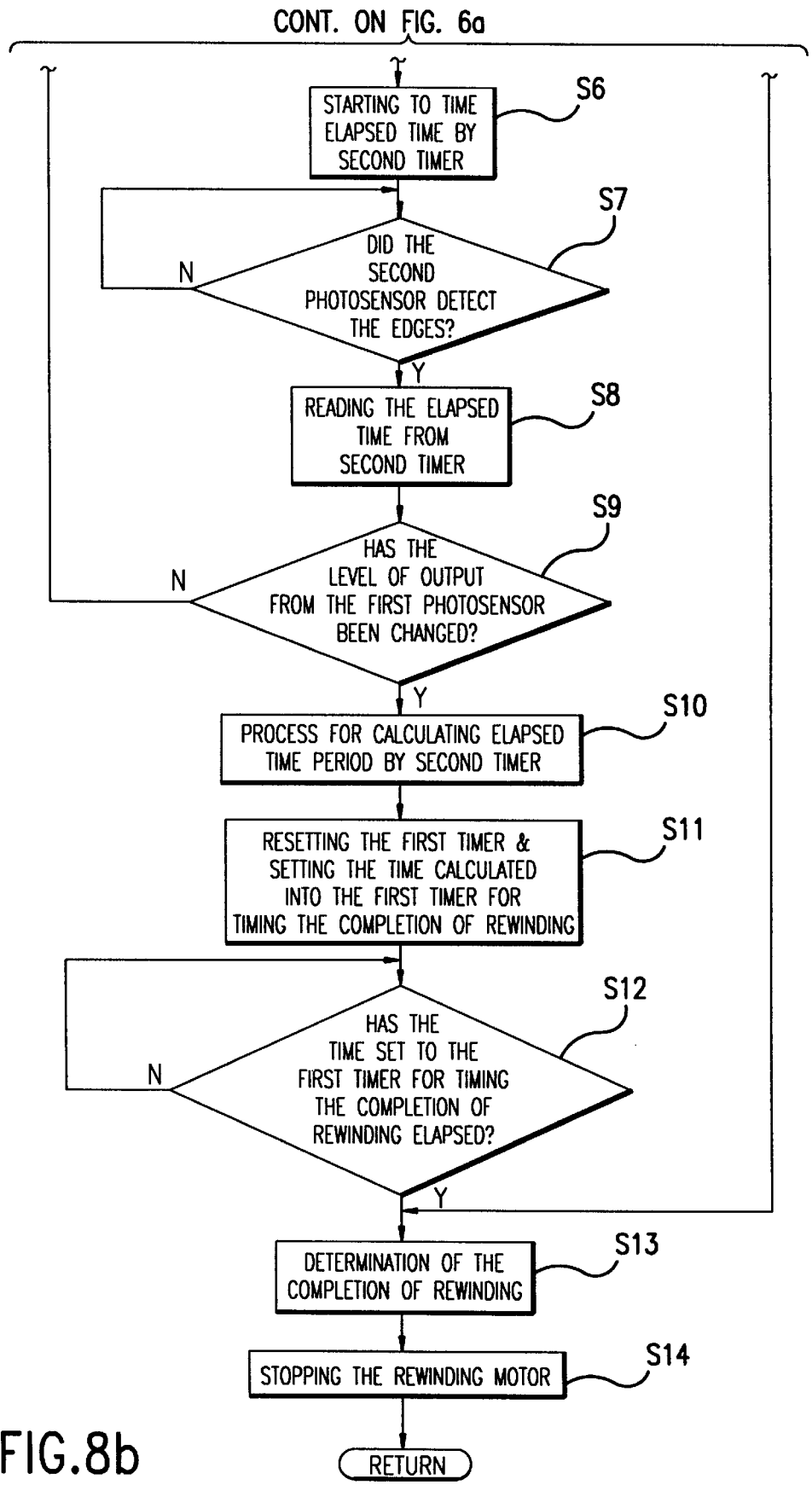

FIG. 8 is a flow chart depicting how a third embodiment of the rewinding apparatus of the present invention operates.

As described earlier, if the film rewinding is commenced automatically or manually (S1), the rewinding motor is actuated (S2). At this time, the first timer 1a for timing the completion of the film rewinding is initially set (S3) and the first timer 1a is started (S4). If the front edge of the film or the perforation edges are not detected by the first photosensor 4 within the set time period of the first timer 1a, a determination is made that the rewinding has been completed (S5→S13), and the rewinding motor is stopped (S14).

On the other hand, if the front edge of the film or the perforation edge is detected by the first photosensor 4 within the set time period of the first timer 1a (S5), timing of the elapsed time period is commenced by the second timer 1b (S6). When the film is further rewound, and if the front edge or the perforation edge is detected by the second photosensor 5 (S7), the elapsed time is read from the second timer 1b (S8), and a confirmation is made as to whether the level of the output signal of the first photosensor 4 remains unchanged (S9). If the level of the output signal of the first photosensor 4 is the same as the level of the output signal detected at Step 5 (S5), a determination is made that the front edge of the film has passed the second photosensor 5, and the set time period of the first timer 1a for timing the completion of rewinding is calculated based on the elapsed time period timed by the second timer 1b (S10). On the other hand, if the level of the output signal of the first photosensor 4 has changed, a determination is made that the perforation edge has passed the position of the second photosensor 5, that is, it is in the middle of rewinding the film, and the process enters into a state in which it waits for a detection of a perforation edge by the first photosensor (S5). This operation is repeated until the front edge of the film is detected.

Figure 9A:
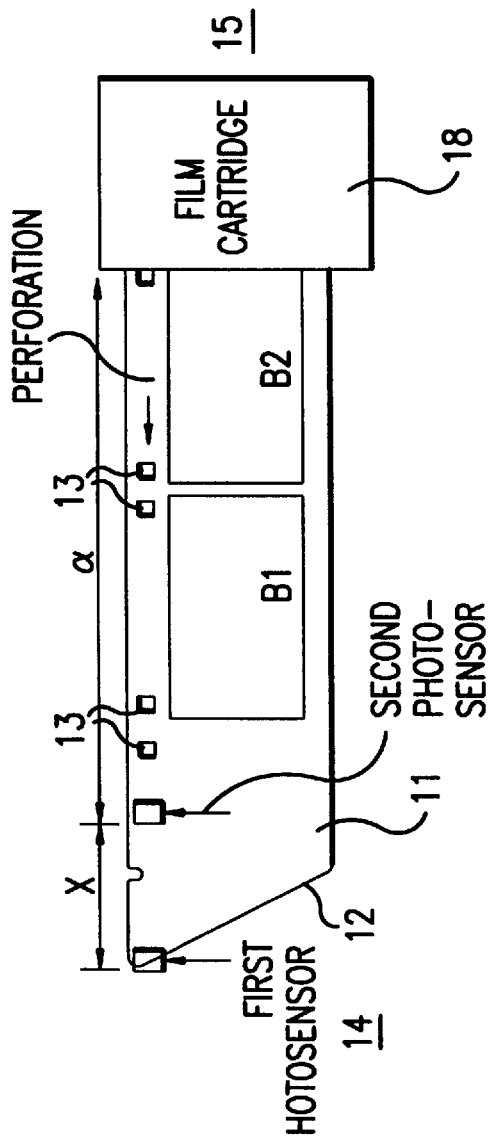
FIGS. 9a and 9b are diagrammatic views illustrating the camera film as it advances into the film cartridge for understanding a method of calculating the set time period used by the timer for timing the completion of rewinding in the third embodiment of the film rewinding apparatus of the present invention.

Assuming the elapsed time period timed by the second timer 1b as "T1", and the positional space between the first photosensor 4 and the second photosensor 5 as "x" as shown in FIG. 9a, the film rewinding speed is calculated as follows:

$$v = x/T1. \qquad \text{[Equation 5]}$$

Figure 9B:
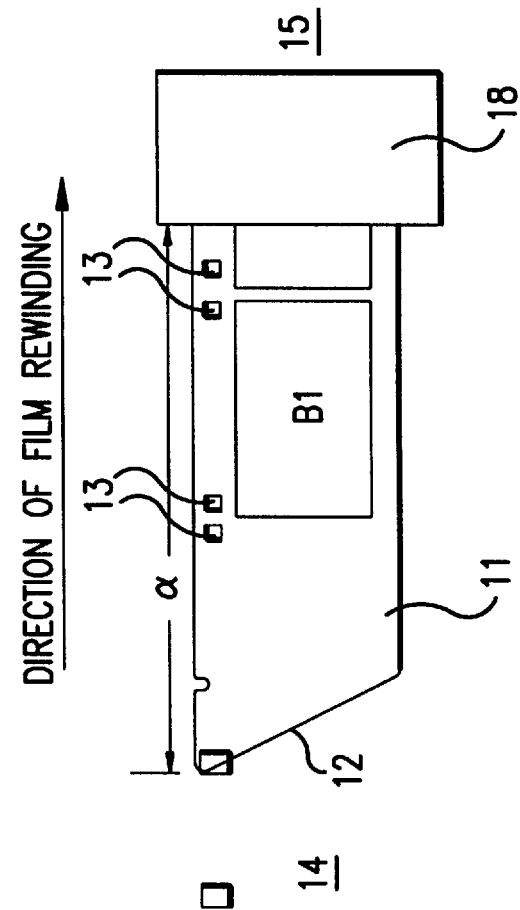

Moreover, assuming the distance from the second photosensor 5 to the film cartridge as "α" as shown in FIGS. 9a and 9b, the time "T2" during which the remaining film is completely rewound, can be determined as follows:

$$\begin{aligned} T2 &= \alpha/v. \qquad \text{[Equation 6]} \\ &= \alpha \times T1/x. \end{aligned}$$

The timer 1a for timing the completion of rewinding is reset, and the computed time "T2" is reestablished to the first timer 1a (S11). Then, the process waits until the set time period of the first timer 1a elapses (S12). The completion of rewinding is determined at the time when the set time period is elapsed (S13), and the rewinding motor is stopped (S14).

In each embodiment described above, the film feeding motor control device 3 is the rewinding means; the microcomputer 1 is the controlling means, the calculating means, and the setting means; the first photosensor 4 and the microcomputer 1 are the first edge detecting means and the first front edge detecting means; the second photosensor 5 and the microcomputer 1 are the second edge detecting means and the second front edge detecting means; the first timer 1a is the timer for timing the completion of film rewinding; and the second timer 1b is the timing means, respectively.

According to the present invention described above, the first edge detecting means is positioned on the rewinding-spool side of the camera on the path on which the perforations of the film pass and the second edge detecting means is positioned on the film cartridge side. The set time period used by the timer for timing the completion of film rewinding is calculated based on the time until the perforation edge detected by the first edge detecting means is detected by the second edge detecting means. If the perforation edge of the film is not detected within the set time period, a determination is made that the film rewinding has been completed and the rewinding operation is terminated. As a result, because the film speed, existing immediately before the film is completely rewound into the cartridge, can be obtained and because the set time period for the timer for timing the completion of rewinding is calculated based on the film speed, the set time period becomes extremely close to the actual time required for rewinding. Thus, wasting battery power by activating the rewinding motor more than necessary can be prevented and the problem associated with the rewinding motor being stopped although the film has not completely been rewound into the cartridge is also prevented. In addition, it is not necessary to conduct experiments in order to determine the set time period as was required in conventional art and, therefore, an accurate set time period can be calculated regardless of changes in environmental conditions.

Moreover, according to the present invention, the first edge detecting means is positioned on the winding-spool side of the camera on the path on which the perforations for the film pass and the second edge detecting means is positioned on the film cartridge side of the camera. The set time period used by the timer for timing the completion of film rewinding is calculated based on the time during which the last perforation edge of each frame detected by the first edge detecting means is detected by the second edge detecting means. If the perforation edges of the film are not detected within a set time period, a determination is made that the film rewinding has been completed and the rewinding operation is terminated. As a result, because the film speed existing immediately before the film is completely rewound into the cartridge can be obtained and because the set time period used by the timer for timing the completion of rewinding is calculated based on the film speed, the set time period becomes extremely close to the actual time required for rewinding. Thus, wasting battery power by actuating the rewinding motor more than necessary can be prevented and the problem associated with the rewinding motor being stopped although the film has not completely been rewound into the cartridge is also prevented. In addition, it is not necessary to conduct experiments in order to determine the set time period, as was required in conventional art, and, therefore, an accurate set time period can be calculated regardless of changes in environmental conditions.

Furthermore, according to the present invention, the first front edge detecting means is positioned on the winding-spool side of the camera on the path on which the perforations for the film pass and the second front edge detecting means is positioned on the film cartridge side. The set time period used by the timer for timing the completion of film rewinding is calculated based on the time during which the last perforation edge of each frame that was detected by the first front edge detecting means is detected by the second front edge detecting means. If the perforation edges of the film are not detected within the set time period, a determination is made that the film rewinding has been completed and the rewinding operation is terminated. As a result, because the film speed existing immediately before the film has been completely rewound into the cartridge can be obtained, and because the set time period used by the timer for timing the completion of rewinding is calculated based on the film speed, the set time period becomes extremely close to the actual time required for rewinding. Thus, wasting battery power by actuating the rewinding motor more than necessary can be prevented and the problem associated with the rewinding motor being stopped although the film has not completely been rewound into the cartridge, is also prevented. In addition, it is not necessary to conduct experiments in order to determine the set time period, as was required in conventional art, and, therefore, an accurate set time period can be calculated regardless of changes in environmental conditions.

What is claimed is:

1. A film rewinding apparatus for a camera having rewinding means for rewinding film into a film cartridge and controlling means which determine the completion of film rewinding and terminate the rewinding operation performed by the rewinding means when perforation edges of perforations formed into the film are not detected within a set time period by a timer which times the completion of film rewinding, the film rewinding apparatus comprising:

first edge detecting means for detecting the perforation edges, said first edge detecting means being positioned on a winding-spool side of the camera on a path on which the perforations of the film pass;

second edge detecting means for detecting the perforation edges, said second edge detecting means being positioned on a side of the film cartridge on the path on which the perforations of the film pass;

timing means for timing a time period during which the perforation edges detected by said first edge detecting means are detected by said second edge detecting means;

calculating means for calculating the set time period for use by the timer which times the completion of the film rewinding based on the time period determined by said timing means; and setting means for setting the timer which times the completion of film rewinding with the set time period calculated by said calculating means.

2. The film rewinding apparatus for a camera claimed in claim 1, wherein said calculating means calculate the set time period based on the time period determined by said timing means and a distance measured between said first edge detecting means and said second edge detecting means and between said second edge detecting means and the film cartridge.

3. A film rewinding apparatus for a camera having rewinding means for rewinding film into a film cartridge and controlling means which determine the completion of film rewinding and terminate the rewinding operation performed by the rewinding means when perforation edges of perforations formed into the film are not detected within a set time period by a timer which times the completion of film rewinding, the film rewinding apparatus comprising:

first edge detecting means for detecting the perforation edges, said first edge detecting means being positioned on a winding-spool side of the camera on a path on which the perforations of the film pass;

second edge detecting means for detecting the perforation edges, said second edge detecting means being positioned on a film cartridge side of the camera on the path on which the perforations of the film pass;

timing means for timing a time period during which a last perforation edge of a plurality of perforation edges extending along a respective one of a plurality of frames of the film detected by said first edge detecting means is detected by said second edge detecting means;

calculating means for calculating the set time period for use by the timer which times the completion of film rewinding based on the time period determined by said timing means; and setting means for setting the timer which times the completion of film rewinding with the set time period calculated by said calculating means.

4. The film rewinding apparatus for a camera claimed in claim 3, wherein said calculating means calculate the set time period based on the time period determined by said timing means and a distance measured between said first edge detecting means and said second edge detecting means and between said second edge detecting means and the film cartridge.

5. A film rewinding apparatus for a camera having rewinding means for rewinding a film into a film cartridge and controlling means which determine the completion of film rewinding and terminate the rewinding operation performed by the rewinding means when perforation edges of perforations formed into the film are not detected within a set time period used by a timer which times the completion of film rewinding, the film rewinding apparatus comprising:

first front edge detecting means for detecting a front edge of the film and the perforation edges, said first front edge detecting means being positioned on a winding-spool side of the camera on a path on which the perforations of the film pass;

second front edge detecting means for detecting the front edge of the film and the perforation edges, said second front edge detecting means being positioned on a film cartridge side of the camera on the path on which the perforations of the film pass;

timing means for timing a time period during which the front edge of the film detected by said first front edge detecting means is detected by said second front edge detecting means;

calculating means for calculating the set time period for use by the timer which times the completion of the film rewinding, the set time period being based on the time period determined by said timing means; and setting means for setting the timer which times the completion of the film rewinding with the set time period calculated by said calculating means.

6. The film rewinding apparatus for a camera claimed in claim 5, wherein said calculating means calculate said set time period based on the time period determined by said timing means and a distance measured between said first front edge detecting means and said second front edge detecting means and between said second front edge detecting means and the film cartridge.

7. A method of rewinding film in a camera having a power-driven rewinding device for rewinding the film into a film cartridge, comprising the steps of:

detecting a first indication of a plurality of indications on the film by a first detector disposed within the camera as the film is being rewound into the film cartridge;

detecting the first indication by a second detector disposed within the camera and in a spaced apart downstream relationship from the first detector relative to the rewinding film;

determining that a set time period during which the indication detected by the first detector is detected by the second detector is not exceeded;

serially detecting sequential ones of remaining indications of the plurality of indications on the film by the first detector and the second detector within the set time period;

determining that the set time period between sequential ones of the plurality of indications is not exceeded;

upon determining that the set time period is exceeded, calculating a completion time period based upon a length of film remaining to be rewound; and permitting the power-driven rewinding device to operate during the completion time period until the completion time period expires.

8. A method according to claim 7, wherein the set time period is recalculated each time after the step of determining that the set time period has not been exceeded.

9. A film rewinding apparatus for a camera having a rewinding mechanism for rewinding film into a film cartridge and a controller which determines the completion of film rewinding and terminates the rewinding operation performed by the rewinding mechanism when perforation edges of perforations formed into the film are not detected within a set time period by a timer which times the completion of film rewinding, the film rewinding apparatus comprising:

a first edge detector for detecting the perforation edges, said first edge detector being positioned on a winding-spool side of the camera on a path on which the perforations of the film pass;

a second edge detector for detecting the perforation edges, said second edge detector being positioned on a side of the film cartridge on the path on which the perforations of the film pass;

a timing device for timing a time period during which the perforation edges detected by said first edge detector are detected by said second edge detector;

a calculator for calculating the set time period for use by the timer which times the completion of the film rewinding based on the time period determined by said timing device; and a setting device for setting the timer which times the completion of film rewinding with the set time period calculated by said calculator.

10. The film rewinding apparatus for a camera claimed in claim 9, wherein said calculator calculates the set time period based on the time period determined by said timing device and a distance measured between said first edge detector and said second edge detector and between said second edge detector and the film cartridge.

11. A film rewinding apparatus for a camera having a rewinding mechanism for rewinding film into a film cartridge and a controller which determines the completion of film rewinding and terminates the rewinding operation performed by the rewinding mechanism when perforation edges of perforations formed into the film are not detected within a set time period by a timer which times the completion of film rewinding, the film rewinding apparatus comprising:

a first edge detector for detecting the perforation edges, said first edge detector being positioned on a winding-spool side of the camera on a path on which the perforations of the film pass;

a second edge detector for detecting the perforation edges, said second edge detector being positioned on a film cartridge side of the camera on the path on which the perforations of the film pass;

a timing device for timing a time period during which a last perforation edge of a plurality of perforation edges extending along a respective one of a plurality of frames of the film detected by said first edge detector is detected by said second edge detector;

a calculator for calculating the set time period for use by the timer which times the completion of film rewinding based on the time period determined by said timing device; and a setting device for setting the timer which times the completion of film rewinding with the set time period calculated by said calculator.

12. The film rewinding apparatus for a camera claimed in claim 11, wherein said calculator calculates the set time period based on the time period determined by said timing device and a distance measured between said first edge detector and said second edge detector and between said second edge detector and the film cartridge.

13. A film rewinding apparatus for a camera having a rewinding mechanism for rewinding a film into a film cartridge and a controller which determines the completion of film rewinding and terminates the rewinding operation performed by the rewinding mechanism when perforation edges of perforations formed into the film are not detected within a set time period used by a timer which times the completion of film rewinding, the film rewinding apparatus comprising:

a first front edge detector for detecting a front edge of the film and the perforation edges, said first front edge detector being positioned on a winding-spool side of the camera on a path on which the perforations of the film pass;

a second front edge detector for detecting the front edge of the film and the perforation edges, said second front edge detector being positioned on a film cartridge side of the camera on the path on which the perforations of the film pass;

a timing device for timing a time period during which the front edge of the film detected by said first front edge detector is detected by said second front edge detector;

a calculator for calculating the set time period for use by the timer which times the completion of the film rewinding, the set time period being based on the time period determined by said timing device; and a setting device for setting the timer which times the completion of the film rewinding with the set time period calculated by said calculator.

14. The film rewinding apparatus for a camera claimed in claim 13, wherein said calculator calculates said set time period based on the time period determined by said timing device and a distance measured between said first front edge detector and said second front edge detector and between said second front edge detector and the film cartridge.

* * * * *